Aug. 29, 1933. S. KERSTEN 1,924,943
WATER FAUCET
Original Filed May 12, 1930
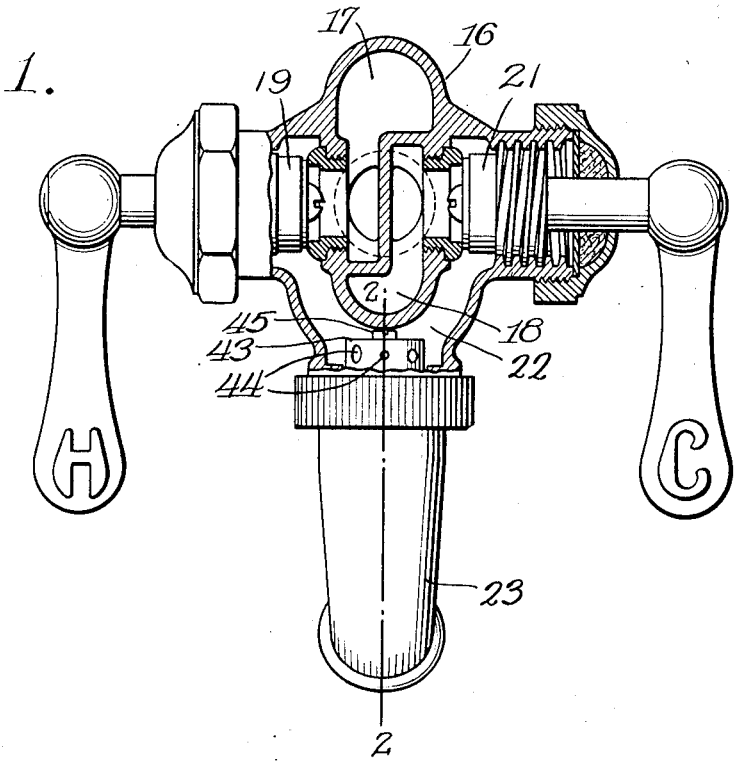
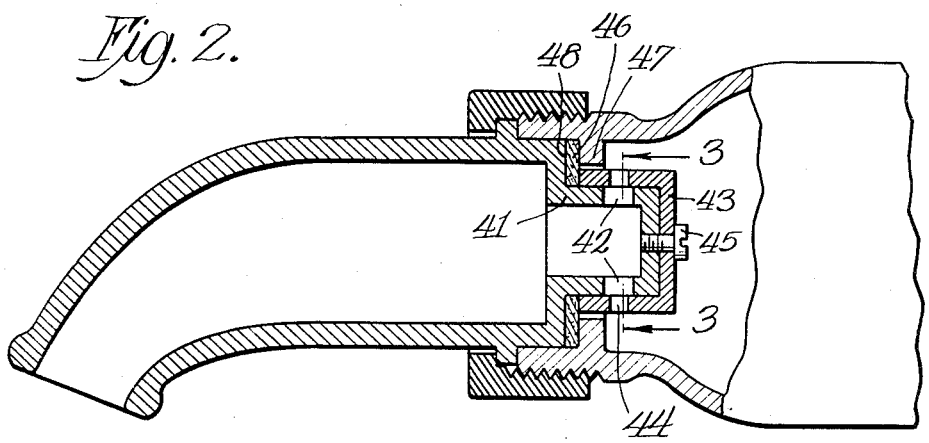
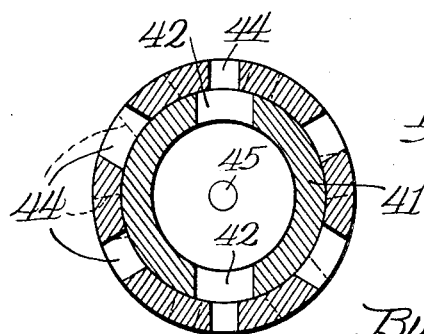
Inventor
Samuel Kersten
By George E. Mueller
Atty.

Patented Aug. 29, 1933

1,924,943

UNITED STATES PATENT OFFICE 1,924,943

WATER FAUCET

Samuel Kersten, Chicago, Ill.

Original application May 12, 1930, Serial No. 451,563. Divided and this application February 24, 1932. Serial No. 594,927

6 Claims. (Cl. 251—9)

My invention relates in general to water faucets, and more in particular to hot and cold water mixing faucets adapted for lavatory use. The invention also contemplates the use with such a faucet of improved water control features and water discharge features as will be pointed out. This application is a division of my copending application Serial No. 451,563, filed May 12, 1930, now Patent 1,854,796, patented Apr. 19, 1932.

While the features of my invention are adapted for use in many ways, I shall describe them in connection with the usual lavatory or wash bowl.

My invention is in the nature of an improvement in the faucet and nozzle shown in my prior Patent Number 1,734,583. In the patent disclosed, a predetermined instant supply of water is obtained by the use of a novel type of nozzle. This nozzle, however, is not adjustable, the adjustment being made if desired by replacing the nozzle with a nozzle having different sized openings. A salient feature, in any event, is the saving of water, particularly where relatively high main pressures occur.

One of the principal objects of my present invention is to provide an improved faucet.

Another object is the provision of an improved water saving feature adapted for use with various types of faucets.

Another object is the provision of an improved adjustable water saving feature adapted for use on any usual style of faucet.

Other objects and features of the invention will be apparent from a consideration of the following detailed description taken with the accompanying drawing, wherein, Fig. 1 is an enlarged plan view thereof, partly in section, Fig. 2 is an enlarged fragmentary sectional view taken along the line 2—2 of Fig. 1, showing the spout or nozzle and adjustable water saving feature, and Fig. 3 is an enlarged sectional view taken along the line 3—3 of Fig. 2.

I show my invention in connection with a mixing faucet, having hot and cold water values, but this is merely illustrative, as other faucets may be used. Referring to the drawing, the faucet proper includes a body 16, with hot and cold water chambers 17 and 18 respectively, disposed side by side, and valve mechanism 19 and 21 are controlling the flow of hot and cold water from such chambers to a mixing chamber 22, to which a spout or nozzle 23 is connected, the spout serving as a common discharge opening for the hot and cold water. With a vertically disposed outlet, the spout takes the form of a relatively short straight nozzle, as those skilled in the art readily understand.

In connection with the employment of my faucet, particularly in large installations where the water pressure may vary, I prefer to use a water saving nozzle or spout such as shown in Figs. 1 to 3. The spout 23, of any suitable shape, is adapted to be attached to the outlet of the faucet in any usual manner. A head 41 with axial openings 42 but otherwise entirely closed, is provided integral with the spout, over which a sleeve 43 is placed, a ground fit being provided between the head and sleeve with a very gradual taper if found necessary so that the sleeve will tend to remain in the position in which it is set. The sleeve 43 also has axial openings 44 arranged in pairs so as to communicate with the openings 42 in the head, the pairs being graduated in size to admit more or less water to the spout, as required by the pressure with which the water is delivered thereto.

Preferably the largest pair of openings in the sleeve have a combined area substantially equal to the area of the smallest opening in the spout, or, in other words, an area substantially sufficient to allow the full water pressure directly to the spout. The smaller openings cut down the volume of water flowing to the spout, for since with the relatively long spout opening accommodating a relatively large body of water, the effective pressure is cut down greatly. The proper openings 44 can be selected to give to the user the proper water pressure to the spout of an excess or lower pressure, depending upon what his individual idea on the subject may be.

In order to maintain the sleeve setting without any possibility of failure of adjustment, I may employ locking means absolutely to hold the sleeve in the setting to which it is adjusted. In one simple form with which good results are obtained, I provide a central end opening in the sleeve through which a set or anchoring screw 45 extends, and is threaded into the head 41. The sleeve can therefore be set, and will remain in a fixed position when the screw 45 is driven tightly into place.

Should no pair of openings provided in the sleeve serve to give the proper flow of water with the particular pressure conditions encountered, the sleeve can be set so that the openings are partly closed as shown in dotted lines in Fig. 3. It is obvious that by this means even with a single pair of openings in the sleeve any desirable water flow can be obtained with any pressure encountered in the main lines.

A desirable feature of this arrangement is that the openings 42 in the head can be closed entirely by the sleeve if desired, so that no flow of water whatsoever is possible from the faucet. This feature will have an application where it will be desired to shut off certain faucets, for example, in a large factory building, where it is impossible to shut off the supply of water feeding the particular faucets which are not required for use. It has been its greatest application, however, when the faucets are applied to new buildings, particularly large apartment buildings and apartment hotels. It is well known that often when the flow of water is restricted at the outlet in this manner there is a tendency to cause a back pressure which might possibly be sufficient under some circumstances to work around the threads unless suitable precautions are taken. I provide a washer 46, preferably of fairly hard fibre, and this is clamped between a peripheral shoulder 47 on the valve body outlet and a shoulder 48 provided on the spout or nozzle. By means of this arrangement a fully tight connection is obtained.

While I have described the details of my invention to make the same clear to those skilled in the art, it is obvious that other details and embodiments may be used without departing from the invention as defined in the appended claims.

What I claim as new and desire to protect by Letters Patent of the United States is:—

1. In a faucet, a discharge orifice, a spout attached to said orifice, an apertured head on the spout extending into said orifice, and a sleeve extending over said head provided with a plurality of sets of orifices of different size, each set adapted to be aligned with apertures in the head to control the volume of water passing therethrough.

2. In a faucet, a discharge orifice, a spout attached to said orifice, an apertured head on the spout extending into said orifice, and a sleeve extending over said head provided with a plurality of sets of orifices of different size, each set adapted to be aligned with apertures in the head to control the volume of water passing therethrough, the largest of such sets of orifices having a total area sufficient to deliver substantially full pressure of water to said spout.

3. In a faucet, a discharge orifice, a spout attached to said orfice, an apertured head on the spout extending into said orifice, and a sleeve extending over said head provided with a plurality of sets of orifices of different size, each set adapted to be aligned with apertures in the head to control the volume of water passing therethrough, and means for locking said sleeve to maintain the setting thereof.

4. In a faucet, a discharge orifice, a spout attached to said orifice, an apertured head on the spout extending into said orfice, a sleeve fitting snugly around said head and having an aperture adapted to communicate with the aperture in the head, and means for locking said sleeve in any selected position, either to allow full flow of water through the apertures, a restricted flow by the apertures being partly out of line, or an extremely arrested flow by the apertures being entirely out of line.

5. In a faucet, a water chamber, a discharge orifice communicating therewith, a spout secured to the faucet over said orifice and having a head projecting into said chamber, said head being generally tubular with a closed end, and having a pair of oppositely disposed openings, and a sleeve extending over the said head and having openings adapted to register with the openings in the head.

6. A spout adapted for attachment to a faucet having an orifice chamber, said spout having means for attachment over said orifice, a head adapted to project into said chamber, said head closed except for a single pair of oppositely disposed apertures, and a sleeve extending over the head and having apertures adapted to register with the apertures in the head.

SAMUEL KERSTEN.